United States Patent [19]
Yamamoto et al.

[11] Patent Number: 6,077,013
[45] Date of Patent: *Jun. 20, 2000

[54] BOLT EQUIPPED WITH PILOT

[75] Inventors: Naoki Yamamoto; Hiroyuki Sata, both of Toyota; Hideki Tamura, Ikoma, all of Japan

[73] Assignee: Topura Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/981,480
[22] PCT Filed: Apr. 25, 1997
[86] PCT No.: PCT/JP97/01461
  § 371 Date: Mar. 9, 1998
  § 102(e) Date: Mar. 9, 1998
[87] PCT Pub. No.: WO97/41360
  PCT Pub. Date: Nov. 6, 1997

[30] Foreign Application Priority Data

Apr. 26, 1996  [JP]  Japan .................. 8-131019

[51] Int. Cl.[7] .................................................. F16B 25/00
[52] U.S. Cl. ..................................... 411/386; 411/426
[58] Field of Search ................... 411/386, 411, 411/412, 426

[56] References Cited

U.S. PATENT DOCUMENTS

| | | | |
|---|---|---|---|
| 2,382,019 | 8/1945 | Miller | 411/386 |
| 3,352,190 | 11/1967 | Carlson | 411/386 |
| 4,261,402 | 4/1981 | Stanaitis | 411/386 |
| 4,973,209 | 11/1990 | Essom | 411/386 |
| 5,209,622 | 5/1993 | Kazino | 411/386 |

FOREIGN PATENT DOCUMENTS

| | | | |
|---|---|---|---|
| 3272309 | 12/1991 | Japan | 411/386 |

*Primary Examiner*—Flemming Saether
*Attorney, Agent, or Firm*—Armstrong, Westerman, Hattori, McLeland & Naughton

[57] ABSTRACT

A bolt provided with a pilot of the present invention is formed with a pilot portion, on the front end side of a shank portion, having an axis aligning with an axis of the shank portion. The pilot portion is formed with a guide thread portion continuous to the normal thread portion to about half portion of the pilot portion. The connecting portion between the normal thread portion and the guide thread portion has a connection thread portion having an outer diameter gradually reducing from the normal thread portion toward the front end portion of the pilot portion. According to such structure, workability can be improved.

1 Claim, 2 Drawing Sheets

BOLT EQUIPPED WITH PILOT

TECHNICAL FIELD

The present invention relates to threaded bolts having a pilot portion for engaging the inner threaded surface of a fastening member with the threads of such bolts for aligning the fastening member threads with the bolt threads before such threads engage and draw such bolt and such fastening member together."

BACKGROUND ART

FIG. 4 shows a conventional bolt having a pilot portion for engagement in a predrilled aperture. The bolt 100 is provided with a head portion 102 and a shank portion 103. The shank portion 103 is formed with a thread 103-A (male thread portion) treaded into internal thread 106 (female thread portion) formed in an object member 106A to be engaged with the bolt. A pilot portion 105 is formed to the front end of the shank portion 103 so that the axis (not shown) of the pilot portion 105 accords with that of the shank portion 103. In such bolt, an incomplete thread portion 104 is formed at a boundary portion between the normal thread 103-A and the pilot portion 105.

When the bolt 100 is fastened to the object member 106A, the pilot portion 105 is first inserted into an insertion hole 107 of the object member 106A to keep a linearity of the bolt 100 relative to the object member 106A to a certain degree, and thereafter, the bolt 100 or the object member 106A is rotated by means of an automatic fastening machine or the like so that the normal thread 103-A of the bolt and the internal thread 106-A of the nut are threaded together, completing the fastening.

However, in the conventional art mentioned above, the following problems commonly occur.

In the fastening working between the bolt 100 and the object member 106, the bolt 100 is not perpendicularly inserted into the object member 106 with respect to the axis thereof but the bolt 100 is inserted in an inclined manner. This results in a cross point between the two spirals constituted by the tops of the normal thread 103-A and the internal thread 106-A. That is, a torque due to the driving operation of the automatic fastening machine and a thrusting force by a worker are concentrated at such cross point forming a point contacting portion.

With the bolt provided with the pilot portion of FIG. 4, the front end portion of the pilot portion 105 first contacts the internal thread 106-A, but in this time, less resisting force against the torque and the thrusting force is caused. The resisting force is increased at a time when the top of the internal thread 106-A contacts the incomplete thread portion 104, and the force is concentrated on the contact point of the top of the internal thread 106-A to the incomplete thread portion 104. In this time, the contact point (line) of the incomplete thread portion 104 is damaged and, therefore, the internal thread 106-A bites the same and is damaged.

In order to obviate such damage, the bolt 100 and the object member 106 are rotated manually by a hand for several turns (in usual, they are rotated till they are surely screw engaged), and thereafter, the fastening working has been performed by using the automatic fastening machine or the like, resulting in the lowering of the workability.

SUMMARY OF THE INVENTION

The present invention provides a bolt with a pilot portion to achieve improved workability and high quality.

In the present invention, a bolt having a pilot with a normal thread portion for engagement with an internal thread portion of a member to be fastened is formed to a shank portion of the bolt and a cylindrical pilot portion having an axis aligning with an axis of the shank portion is formed to the front end side of the shank portion. The bolt is characterized in that the pilot portion is formed with a guide thread portion, the guide thread portion being continuous to a front end of the normal thread portion and extending to a predetermined portion on the cylindrical pilot portion so as to provide a diameter at the pilot position equal to or smaller than an inner diameter of the internal thread portion.

According to this structure, when the pilot portion of the bolt and the object member are clamped together, the guide thread portion at the leading end of the bolt first contacts the internal thread portion of the object member and the object member is guided to the normal thread portion by the guide thread portion.

Further, a cylindrical portion having a diameter larger than a diameter of a bottom portion of the guide thread portion and equal to or smaller than an outer diameter of the guide thread portion may be included at a further front end side of the front side end portion of the guide thread portion.

According to this structure, the straightness of the pilot portion with respect to the object member to be fastened with the bolt is improved by the cylindrical guide portion and the object member can be better guided to the guide thread portion of the bolt.

Furthermore, it may be preferred to form a connecting thread portion between the normal thread portion and the guide thread portion so that an outer diameter gradually reducing from the normal thread portion toward the guide thread portion.

According to this structure, the object member can be smoothly guide from the guide thread portion toward the normal thread portion.

DESCRIPTION OF THE PREFERRED EMBODIMENT

The present invention will be described in detail hereunder by way of preferred exemplary embodiment of the present invention with reference to the accompanying drawings. It is however noted that, with respect to dimensions, materials, shapes and relative arrangement of constitutional elements or members described herein for the embodiment, the scope of the present invention is not limited to those described herein as far as being specifically mentioned to do so.

Figure 1:
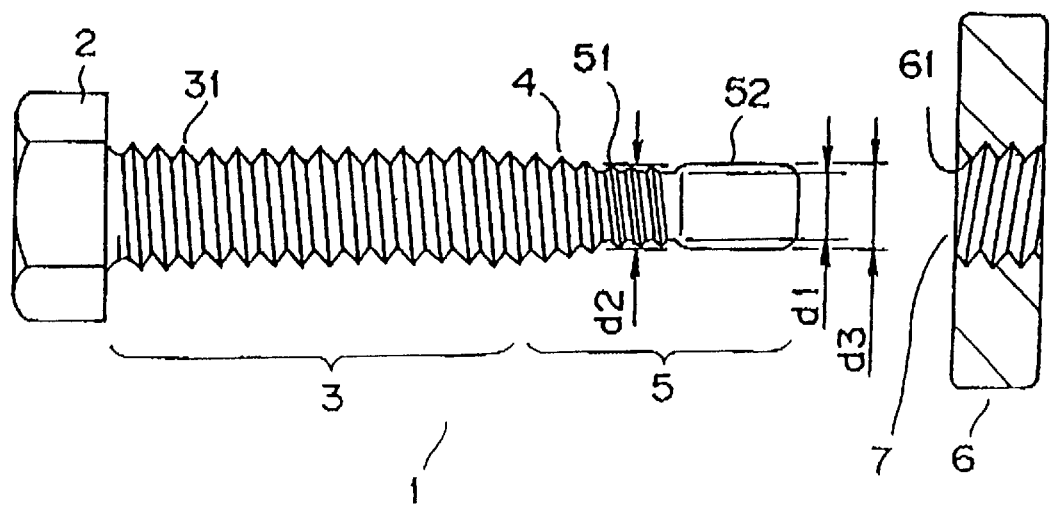
FIG. 1 is a front view, partially in section, of a bolt according go one embodiment of the present invention in a state before insertion thereof into a nut.
Figure 2:
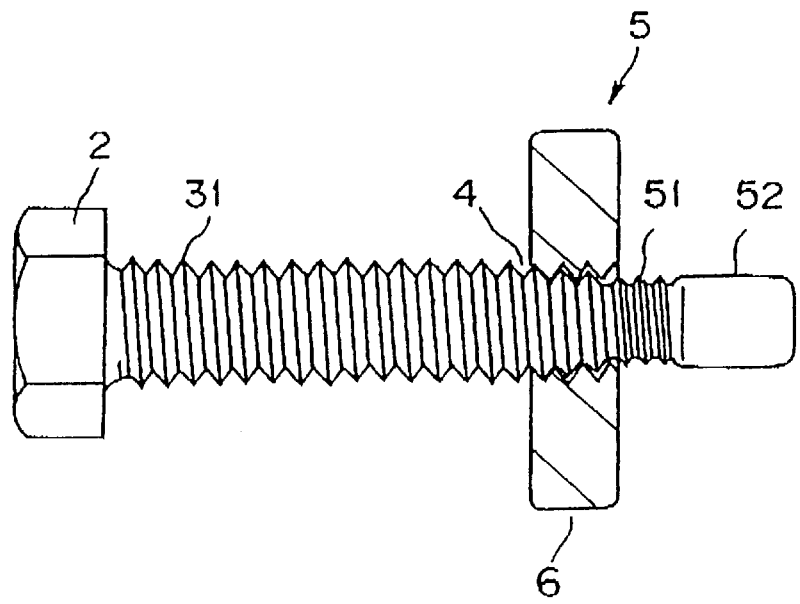
FIG. 2 is a front view, partially in section, of the bolt according to the embodiment of the present invention in a state during insertion thereof into the nut.

FIGS. 1 and 2 represent an exemplary embodiment of the present invention.

FIG. 1 is a front view, partially in section, of a bolt provided with a pilot (pilot portion) according to the present invention, showing a state before the bolt is fastened to a nut, for example, as an object member. The bolt 1 is provided with a head portion 2 and a shank portion 3. Although the head portion 2 is formed as a hexagon head in figures, it may be formed as a hexagon socket head or a slotted flush head. Further, the head portion 2 and the shank portion 3 may be formed integrally or formed with independent head portion 2 and shank portion and 3 which are then welded as a weld bolt.

The shank portion 3 is formed with normal ridge or thread portion 31 having a dimension set to a value adapted to be screwed with an internal thread portion 61 of the object member, i.e., nut 6 in this embodiment.

The shank portion 3 has a front end to which a pilot 5 is formed so that the axis thereof accords with the axis, not shown, of the shank portion 3. The pilot 5 is formed with guide thread portion 51 continuous to the normal thread portion 31 so as to extend to the middle portion of the pilot 5. The normal thread portion 31 of the shank portion 3 is connected to the guide thread portion 51 of the pilot 5 through a connection thread portion 4, being a portion of the shank 3, which has an outer diameter gradually reduced from the normal thread portion 31 to the front end of the shank 3. The guide thread portion 51 has an outer diameter substantially equal to or smaller than the inner diameter of the internal thread portion 61 of the nut 6.

The pilot 5 has a front end portion which if formed as a cylindrical guide portion 52 having a diameter d3 satisfying an equation of d1<d3≦d2, in which d1 is a diameter of a bottom portion of the guide thread portion 51 and d2 is an outer diameter of the guide thread portion 51. It is desirable to form the distal front end of the cylindrical guide portion 52 with rounded edges R.

In the present embodiment, the reference dimensions of these d1, d2 and d3 were set as in the following table.

TABLE

| | Screw | | | | |
| --- | --- | --- | --- | --- | --- |
| | Nominal Diameter | | | | |
| | M 5 | M 6 | M 8 | M 10 | |
| Pitch | 0.8 | 1.0 | 1.25 | 1.25 | 1.5 |
| d1 | 3.9 | 4.6 | 6.3 | 8.3 | 8.0 |
| d2 | 4.1 | 4.9 | 6.6 | 8.6 | 8.3 |
| d3 | 4.0 | 4.8 | 6.5 | 8.5 | 8.2 |

When the bolt 1, having the structure mentioned above, is fastened to the nut 6, the bolt 1 is first inserted into an insertion hole 7 of the nut 6 so that the front end of the pilot 5 contacts the internal thread portion 61 of the nut 6, and in this state, when the nut 6 is rotated by means of, for example, an automatic clamping device, because the bolt 1 and the nut 6 are not completely aligned, the guide thread portion 51 first contact the internal thread portion 61, and the normal thread portion 31 does not abut against the internal thread portion 61.

When the nut 6 is further rotated, the internal thread portion 61 of the nut 6 abutting thread 51 is controlled by the guide thread portion 51 and pitches of bolt 2 and internal threads 61 are aligned, thereby advancing along the guide thread portion 51.

Thereafter, because the diameter of the bolt shank portion increases gradually toward head portion 2 of bolt 1 from the connection thread portion 4 toward the normal thread portion 31, the shank portion 3, having the normal thread portion, can be surely threaded into the nut hole 7, and when the nut is further rotated, the nut 6 is screw engaged with the normal thread portion 31 and firmly fastened to the bolt 1. Therefore, biting between the bolt 1 and the nut 6 does not occur and any preliminary clamping working with a hand is not also required. Thus, the clamping working can be done smoothly by means of an automatic clamping device. FIG. 2 shows a state where the internal thread portion 61 is being threaded with threads 31 of the bolt 1.

Because the bolt 1 is provided with a cylindrical guide portion 52, straightness between bolt 1 and nut 6 can be increased with the cylindrical guide portion 52. The degree of freedom of the inclination of the bolt 1 in comparison with the degree of freedom of the inclination in the case of being not provided with such guide portion is substantially improved, and accordingly, the nut 6 can be more surely guided to the guide thread portion 51 by the guide portion 52 and the working efficiency can be further improved.

Furthermore, in a case where it is required to form the bolt of the structure mentioned above by a method of plastically working threads by means of rolling tool such as a rolling die, when a conventional rolling die is used, a ridge or screw thread is formed on the front end side of the guide thread portion 51 because of the plastic deformation through the formation of a bottom portion at the most front end of the bottom portions of the guide thread portion 51 (i.e. terminal end of the thread portion), and a trotruded ring portion is therefore formed along the tubular shape of the guide portion.

Figure 3:
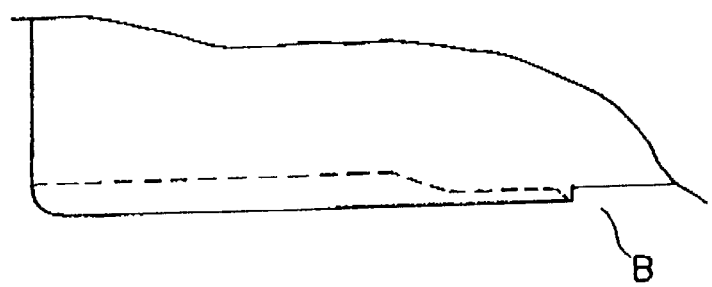
FIG. 3 is a schematic view drawing showing an important portion a rolling die for manufacturing the bolt of the present invention.
Figure 4:
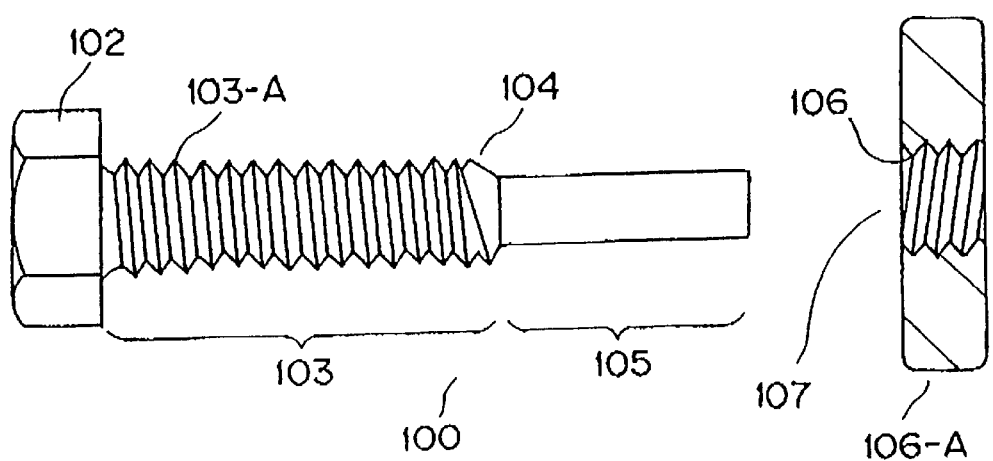
FIG. 4 is a front view, partially in section, of a bolt of a conventional structure in a state before insertion thereof into a nut.

In order to form no ridge portion, and hence, no protruded ring portion to the front end side of a guide thread forming portion (a portion corresponding to the cylindrical guide portion 52) of the rolling die, a pressing portion B will be formed, as shown in FIG. 3, at that portion, and accordingly, the connection between the guide thread portion 51 and the cylindrical guide portion 52 can be smoothly formed. (In FIG. 3, a dotted line corresponds to the outer diameter of the screw.)

As described above, according to the bolt provided with a pilot portion of the present invention, when the bolt having the pilot portion is clamped with an object member 6, the guide thread portion first contacts the internal thread portion 61 of the object member 6, and the object member 6 is guided to the normal thread portion. Accordingly, the object member 6 is prevented from first abutting against the ordinary thread portion, resulting in no loss of parts due to biting and no manual fastening working, realizing improvements in the quality of the product and the workability.

Furthermore, since the straightness of the pilot portion with respect to the object member 6 can be improved and because of the location of the cylindrical guide portion, the object member 6 can be surely guided to the guide thread portion 51, and hence, the workability can be further improved.

Still further, the connecting portion between the normal thread portion 31 and the guide thread portion 51 is formed so that the diameter of the connecting portion is gradually reduced from the normal thread portion to the guide thread portion, so that the object member 6 can be smoothly guided from the guide thread portion toward the ordinary thread portion, thereby further improving the workability.

We claim:

1. A bolt and an internally threaded fastening member;
said bolt having a head, a cylindrical externally threaded shank joined at one end to said head and, at an opposite end of said shank, having a cylindrical pilot; said internally threaded fastening member receiving said cylindrical pilot and guiding said fastening member and said internal threads on said fastening member into meshing engagement with said external threads on said threaded shank of said bolt; said cylindrical externally threaded shank of said bolt having an inwardly tapered end joining said shank to said cylindrical pilot, said cylindrical pilot having a cylindrical guide portion joining said cylindrical pilot to said tapered end of said shank, said external threads on said cylindrical shank extending axially along said inwardly tapered joining end of said shank to said cylindrical guide portion of said cylindrical pilot, said cylindrical guide portion of said cylindrical pilot having external threads on an outer diameter substantially equal to or smaller than the inner diameter of the internal threads of the fastening member, wherein said cylindrical guide portion of said cylindrical pilot has a diameter larger than a diameter of a bottom portion of said external threads of said cylindrical guide portion and equal to or smaller than an outer diameter of said external threads of said cylindrical guide portion at a front side end portion of said cylindrical guide portion, and wherein a connecting thread portion between said external thread portion of said bolt and said external threads of said cylindrical guide portion of said cylindrical pilot toward an outer diameter is gradually reduced from the external thread portion of the shank of said bolt toward the external threads of said cylindrical guide portion.

\* \* \* \* \*